3,128,257
PRODUCTION OF ION EXCHANGE RESINS
Merwin Frederick Hoover and Ralph N. Thompson, Pittsburgh, Pa., assignors to Calgon Corporation, Pittsburgh, Pa.
No Drawing. Filed Feb. 26, 1962, Ser. No. 175,843
7 Claims. (Cl. 260—2.2)

This invention relates to the manufacture of sulfonated copolymers of two or more monomers, comprising a major amount of one or more monovinyl-aromatic compounds and a minor amount of one or more polyvinyl-aromatic compounds. In particular, it relates to a method of swelling ion exchange resin beads prior to sulfonation or other processing to prevent stress and cracking of the beads thereafter.

In the manufacture of ion exchange resins, particularly cation exchange resin beads, it has been common practice to copolymerize a monovinyl-aromatic compound such as styrene with from 0.5–20% or preferably from 3–11% of a polyvinyl-aromatic compound such as divinyl benzene. The copolymerization may take place in a suspension whereby insoluble polymerized beads of substantially uniform size are produced, or in any other known manner. After formation of the beads, it has been common practice heretofore to swell the beads in an organic liquid capable of dissolving uncrosslinked polystyrene according to the teachings of Boyer, U.S. Patent 2,500,149. The beads are, of course, insoluble at this point because of the cross links provided by the divinyl benzene. The beads are then sulfonated in a known manner, such as by heating them in the presence of sulfuric acid, chlorosulfonic acid, or other sulfonating agent. The sulfonic groups thus added are converted to the sodium form to complete the manufacturing process.

It is known that swelling the beads prior to sulfonation is an important step in the manufacture of the most desirable ion exchange resin beads. The capacity of the finished beads for ion exchange is a function of the degree of sulfonation of the copolymer. Preswelling, as is known, permits sulfonation to take place at lower temperatures, at faster rates, and with less discoloration of the beads than in the absence of preswelling. Preswelling reduces the incidence of stearic hindrance during and after the introduction of the relatively large sulfonate groups. Beads which have been sulfonated without preswelling have a tendency on being contacted with water to fracture and break into small fragments unsuitable for most uses of ion exchange resins, whereas preswelling precludes the creation of excessive stain in the molecular structure of the beads when the sulfonate groups are introduced. The strain due to stearic hindrance is most damaging when the beads are washed with water after sulfonation. It is at this time that unpreswollen beads are subject to the most fragmentation, while preswollen beads exhibit the most noticeable resistance to this tendency. Another advantage of preswollen beads is in the prevention of excessive attrition loss during use. By the time the bead reaches the point of use, it has been subject to strain by the introduction of the large $SO_3Na$ radical on almost all of its benzene rings and also by the introduction of water of hydration on each of the $SO_3$ groups. In use, the bead must repeatedly replace its sodium atoms with the large calcium and magnesium atoms. The additional strain of repeated expansion and contraction during use and regeneration results in cracking and fragmentizing known as "attrition loss." A well preswollen bead is significantly resistant to attrition loss as well as fragmentizing during the several steps of its manufacture described above.

The best swelling agents heretofore known for polystyrene-divinyl benzene resins (hereinafter referred to as PS-DVB) and other vinyl aromatic polymers are organic liquids capable of dissolving uncrosslinked polystyrene. Benzene, toluene, and other compounds similar in structure to styrene are the best solvents for polystyrene; however, they are not suitable for use as swelling agents on PS-DVB resins because the sulfonating agent (usually an acid such as sulfuric or chlorosulfonic acid, or sulfur trioxide, etc.) will preferentially attack virtually any organic liquid other than a halogenated hydrocarbon. Perhaps the most widely used swelling agents are the halogenated hydrocarbons, which are generally inert to sulfonating agents. The swelling ability of the halogenated hydrocarbons is limited, however, and their performance requires a period of time which heretofore has not been reduced by any known technique.

We have discovered a method of swelling ion exchange resin beads which is far superior to the use of propylene dichloride or other halogenated hydrocarbon or any other liquid organic compound known to us. Our method comprises contacting the beads with a liquid from the groups consisting of the halides and oxyhalides of sulfur and combinations thereof. In particular, the group of most practical interest includes sulfuryl chloride ($SO_2Cl_2$), thionyl chloride ($SOCl_2$), sulfur monochloride ($S_2Cl_2$), and sulfur dichloride ($SCl_2$).

The following Table I presents the results of several laboratory demonstrations of our invention. The resin used in the demonstrations was a typical unsulfonated ion exchange resin in the form of beads of a size less than 20 mesh (U.S. standard sieve) and greater than 50 mesh, comprising a copolymer of styrene crosslinked with 8% divinyl benzene made by suspension polymerization.

In each of the tests of Table I, a 100 ml. graduated cylinder was filled to the 50 ml. mark with beads of the above description. Sufficient swelling agent was added to float the bead bed, which remained compact throughout the demonstrations. As the swelling agent was absorbed by the beads, more agent was added in order to maintain the bed as a compact floating mass. No heat was applied to the mixture. Results were measured by the volume of the bead bed at the end of the specified periods. A 100% increase, of course, means that the volume of the bead bed increased to a total of 100 ml.

The spectacular nature of the results of Table I may be ascertained by comparing them with the results in U.S. Patent 2,733,231 which employs an inorganic swelling agent. This patent describes the use of liquid sulfur dioxide under extreme conditions of obtain swelling estimated at only 1 to 2 percent.

TABLE I
Swelling of PS-DVB (8% DVB) Resin Beads at Ambient Temperatures

| Swelling Agent | Formula | Percent Volume Increase | |
|---|---|---|---|
| | | 1 Hour | 48 Hours |
| Sulfuryl Chloride | $SO_2Cl_2$ | 54 | 100 |
| Thionyl Chloride | $SOCl_2$ | 100 | 100 |
| Sulfur Monochloride | $S_2Cl_2$ | 95 | 100 |
| Sulfur Dichloride | $SCl_2$ | 95 | 100 |

The same procedure for measuring the percent volume increase was employed in the demonstration recorded as Table II. In this case, however, propylene dichloride, a widely used swelling agent, was also compared. All tests are on the same bath of PS-DVB resins (8% DVB) made by suspension polymerization. The data for 60° C. was obtained by placing the cylinders in an oven held at that temperature. The term "23° C." represents ambient temperature.

TABLE II

|  | 5 min., percent | 15 min., percent | 30 min., percent | 60 min., percent | 120 min., percent |
|---|---|---|---|---|---|
| $SO_2Cl_2$: |  |  |  |  |  |
| 23° C | 10 | 20 | 32 | 42 | 88 |
| 60° C | 20 | 80 | 90 | 90 | 90 |
| $S_2Cl_2$: |  |  |  |  |  |
| 23° C | 52 | 78 | 80 | 80 | 80 |
| 60° C | 60 | 96 | 100 | 100 | 100 |
| $SCl_2$: |  |  |  |  |  |
| 23° C | 90 | 90 | [1] 100 |  |  |
| 60° C | 90 | 100 | [1] 100 |  |  |
| $SOCl_2$: |  |  |  |  |  |
| 23° C | 80 | 94 | 96 | 96 | 96 |
| 60° C | 80 | 96 | 100 | 100 | 100 |
| Propylene dichloride: |  |  |  |  |  |
| 23° C | 8 | 8 | 8 | 8 | 10 |
| 60° C | 8 | 12 | 40 | 66 | 66 |

[1] Exothermic reaction—further estimates not obtainable.

Similar comparisons with various organic solvents have proven the remarkable superiority of our materials over organic solvents in general.

It is interesting to note that unexpectedly retarded swelling results are obtained with freshly distilled pure sulfuryl chloride. It appears to be preferable to use sulfuryl chloride which has been standing for a short time under conditions permitting at least a small degree of molecular dissociation. We may use in our method sulfuryl chloride in which the natural tendency to dissociate has been accelerated artificially such as by bubbling $SO_2$ or $Cl_2$ gas through the undissociated liquid. A small degree of molecular dissociation is sufficient to bring about swelling to a proportionately small degree; indeed, the most noticeable effect of differences in molecular dissociation is not in the ultimate amount of swelling but in the time in which swelling takes place. The ultimate swelling result is approximately the same for freshly distilled sulfuryl chloride and that which has been at least partially dissociated.

Simple distillation apparently does not purify or otherwise completely eliminate dissolved gases or dissociation constituents in sulfur monochloride and thionyl chloride; certainly it may be said that freshly distilled sulfur monochloride and thionyl chloride do not require as long a time to swell the beads as freshly distilled sulfuryl chloride. However, there appears to be a certain amount of dissolved gases and/or dissociation products even in the freshly distilled compounds. We are not able to say whether or not absolutely pure sulfur monochloride, sulfur dichloride, or thionyl chloride without any dissociation would commence to swell the beads immediately but in any event, the question is academic since such a state is extremely abnormal and of no practical consequence. The slightest dissociation is enough to bring about swelling, and this degree of dissociation is established by contact with the beads.

Although we have noted that the molecular dissociation of sulfuryl chloride can be accelerated by bubbling $SO_2$ or $Cl_2$ gas through the pure sulfuryl chloride, and that improved swelling results may be obtained through the use of sulfuryl chloride so treated, such improved results do not arise from the presence of dissolved $SO_2$ alone. This is evidenced by the fact that $SO_2$ dissolved in hexane exhibits no swelling effects on the beads.

The swelling agents of our invention are applicable to any copolymer, terpolymer, or more complex polymer (all referred to in the claims as "copolymers") comprising a major amount of one or more monovinyl aromatic compounds and a minor amount of one or more polyvinyl-aromatic compound. Monovinyl monomers other than aromatics may be substituted for the aromatic monovinyl monomers up to about 50% thereof within the scope of the present invention. In particular, the process is applicable to benzene-insoluble copolymers of a major amount by weight of one or more monoalkenyl aromatic compounds having the general formula $$Ar-\overset{R}{\underset{|}{C}}=CH_2$$

in which Ar is a monovalent aromatic radical of the benzene series and R is a hydrogen or a methyl group, and a minor amount of one or more polyvinyl aromatic compounds. Examples of copolymers of monoalkenyl aromatic compounds and polyvinyl aromatic compounds which may be treated by our process are the copolymers of a minor amount of one or more of the isomeric divinylbenzenes with a major amount of one or more of the compounds styrene, ar-vinyltoluene, ar-vinyl xylene, ar-chlorostyrene, alpha-methyl-styrene or alpha-methyl-para-methyl styrene, etc. In place of divinyl benzene, ar-methyl divinyl-benzene, ar-ethyldivinylbenzene, or mixtures of these with one another or with divinyl benzene may be used. The usual ion exchange resin in current use commercially is a styrene-divinyl benzene copolymer containing about 0.5–20, preferably from 3–11 percent by weight of DVB. Obviously the resin need not be in bead or rounded granule form. Any mass of copolymers as above described is subject to the swelling action of our invention.

There does not appear to be any particular minimum amount of swelling agent necessary to produce a swelling effect. A small amount of our swelling agent is effective to a small degree. Mixtures of our swelling agents are comparable in effectiveness to the compounds used singly.

The beads treated by our invention are readily sulfonated by known methods to produce ion exchange resin beads at least equal in capacity to those preswollen by organic swelling agents. Sulfonation takes place at lower temperatures due to the increased swelling, producing beads of uniformly desirable light color. Another result is less fracturing and breaking of beads on processing to convert to the sodium form.

Following are examples of the complete process of making ion exchange resins by our method.

EXAMPLE I 100 g. of PS-DVB beads (8½% of DVB) of 20 to 50 U.S. standard sieve mesh size were placed in a mixture of 50 ml. thionyl chloride and 300 ml. 98% sulfuric acid for 30 minutes to swell the beads. The mixture was then heated at 105–115° C. for 4 hours. On cooling, dilution, and conversion to the sodium form by contacting with brine, the resulting ion exchange beads had a capacity of 20.4 kgr./cubic ft.

EXAMPLE II 100 g. of PS-DVB beads (8½% DVB) of 20 to 50 U.S. standard sieve mesh size were stirred for one hour in a mixture of 50 ml. sulfuryl chloride and 300 ml. of 98% sulfuric acid. The mixture was then heated to 80–85° C. for 4 hours and the sulfuryl chloride was distilled and collected. During the last 5 minutes of heating, a vacuum was applied by means of a water asperator to remove any $SO_2Cl_2$ remaining. The resulting beads after washing and conversion to the sodium form had a capacity of 19.84 kgr./cu.ft.

EXAMPLE III 100 g. of PS-DVB beads (8½ DVB) of 20 to 50 U.S. standard sieve mesh size were stirred for one hour in a mixture of 50 ml. $SO_2Cl_2$ and 300 ml. 98% $H_2SO_4$. The mixture was heated to 90–95° C. for two hours, after which a vacuum was applied for 15 minutes while still heated to remove any remaining sulfuryl chloride. After cooling, washing, and conversion to the sodium form, the resulting ion exchange beads had a capacity of 20.4 kgr./cubic ft.

EXAMPLE IV 100 g. of PS-DVB beads (8% DVB) were placed into a liter 4-necked flask equipped with stirrer, additional funnel, thermometer, and Claisen reflux adapted, containing 150 gm. sulfuryl chloride. The mixture was stirred for one hour at ambient temperature after which the beads had swelled to 195% of their original volume. The excess sulfuryl chloride was stripped out at 69° C. When the distillate stopped, 400 g. of oleum was added to the beads and the temperature raised and held at 90–95° C. for four hours. They were then cooled, the excess acid removed, and the beads converted to the sodium sulfonate form. The product had a capacity of 19.2 kgr./cubic ft.

EXAMPLE V

A 4-necked flask equipped with a stirrer, thermometer, reflux condenser, and two addition funnels was charged with 100 g. PS-DVB beads (8% DVB) and 400 g. sulfuryl chloride. The mixture was refluxed at 69° C. for 30 minutes, causing considerable swelling, after which 69 ml. of chlorosulfonic acid was added. Refluxing was continued for 2 hours at 69° C.–70° C. After the 2-hour sulfonation period, 300 ml. of propylene dichloride was added and the sulfuryl chloride stripped out at temperatures up to 96° C., with 80% recovery of the sulfuryl chloride. A slow stream of air saturated with water vapor at 90° C. was passed through the flask in order to slowly dilute the excess chlorosulfonic acid over a period of one hour. The mixture of sulfonated beads in propylene dichloride was then steam distilled to remove the propylene dichloride and subsequently brined to convert them to the sodium form. The beads were relatively free from cracks, had a clear amber color, and had a capacity of 18.4 kgr./cubic ft.

It should be mentioned that in the use of the swelling agents of our invention, a small amount of the swelling agent may become stearically trapped in the bead. The last traces of the swelling agent should be removed to prevent cracking and strain in subsequent processing.

Those skilled in the art will also recognize from the examples that our swelling agents are compatible with sulfonating agents and may be mixed therewith during the swelling stage. When the sulfonating agent is used as a carrier for the swelling agent, more efficient displacement of swelling agent seems to occur in its subsequent removal. The steps of swelling and sulfonating may be kept completely separate or they may be accomplished in the same step as with the use of swelling agent-sulfonating agent mixtures; i.e. the beads may continue to swell somewhat while heat is applied for sulfonation, and conversely some sulfonation may take place during what may otherwise be considered primarily the swelling step. The recitation of steps in the claims herein should not be considered strictly sequential in the light of these factors.

Persons skilled in the art of ion exchange resin manufacture will also recognize that our invention provides methods whereby most of the swelling agent may be recovered and reused. Other advantages will no doubt also be evident.

We do not intend to be bound by the specific illustrations herein. Our invention may be otherwise variously practiced within the scope of the following claims.

We claim:
1. Method of swelling a solid copolymer comprising a major proportion by weight of at least one alkenyl monoaryl compound having the general formula

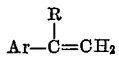

wherein Ar represents an unsubstituted benzene radical and R is a member of the group consisting of hydrogen and the methyl radical, and about 0.5% to about 20% by weight of at least one divinyl aromatic compound of the benzene series, comprising contacting said copolymer with a swelling agent of the group consisting of chlorides and oxychlorides of sulfur and mixtures thereof at a temperature below the boiling point of the swelling agent, whereby to obtain a solvating effect which swells the copolymer.

2. A method of swelling styrene-divinyl benzene copolymer beads comprising about 3% to about 11% by weight divinyl benzene, comprising contacting said beads with a swelling agent of the group consisting of chlorides and oxychlorides of sulfur and mixtures thereof, whereby to obtain a solvating effect which swells the copolymer.

3. Method which comprises swelling a solid copolymer of a major proportion by weight of at least one alkenyl monoaryl compound having the general formula

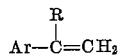

wherein Ar represents an unsubstituted benzene radical and R is a member of the group consisting of hydrogen and the methyl radical, and about 0.5% to about 20% by weight of divinyl benzene by immersing the solid copolymer in a liquid of the group consisting of the chlorides and oxychlorides of sulfur and mixtures thereof until swelling takes place.

4. Method as in claim 1 wherein the copolymer includes up to about 50% by weight of a polymerized monovinyl monomer other than an aromatic.

5. Method as in claim 3 wherein the copolymer includes up to about 50% by weight of a polymerized monovinyl monomer other than an aromatic.

6. Method which comprises swelling a solid copolymer comprising a major proportion by weight of at least one alkenyl aromatic compound having the general formula

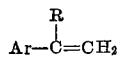

wherein Ar represents an unsubstituted monovalent benzene radical and R is a member of the group consisting of hydrogen and the methyl radical, and about 0.5% to about 20% by weight of at least one divinyl aromatic compound of the benzene series, by contacting the copolymer with a liquid of the group consisting of chlorides and oxychlorides of sulfur at a temperature less than the boiling point of said liquid, and reacting the swollen copolymer with a sulfonating agent.

7. Method of making a cation exchange resin of a solid mass of copolymer comprising a major proportion by weight of styrene and about 0.5% to about 20% divinyl benzene comprising immersing said mass in a liquid of the group consisting of the chlorides and oxychlorides of sulfur thereby to swelling the mass, and subsequently sulfonating said copolymer.

References Cited in the file of this patent

UNITED STATES PATENTS 2,733,231     Bauman _____ Jan. 31, 1956
2,867,611     Teot _____ Jan. 6, 1959

OTHER REFERENCES

Whitmore: Organic Chemistry, p. 288, 2nd edition (1951), D. Van Nostrand Company, New York.

UNITED STATES PATENT OFFICE
CERTIFICATE OF CORRECTION

Patent No. 3,128,257                                April 7, 1964

Merwin Frederick Hoover et al.

It is hereby certified that error appears in the above numbered patent requiring correction and that the said Letters Patent should read as corrected below.

Column 1, line 50, for "stain" read -- strain --; column 2, line 49, for "of" read -- to --; line 70, for "bath" read -- batch --; column 4, line 63, for "(8½ DVB)" read -- (8½% DVB) --; line 74, for "a liter" read -- a l liter --; column 6, line 56, for "swelling" read -- swell --.

Signed and sealed this 28th day of July 1964.

(SEAL)

Attest:

ESTON G. JOHNSON
Attesting Officer

EDWARD J. BRENNER
Commissioner of Patents